Jan. 12, 1932.    L. S. WALLACE    1,841,262
SHOOTING SALON
Filed Aug. 14, 1930    7 Sheets-Sheet 1

Lenoard S. Wallace
INVENTOR
BY Victor J. Evans
ATTORNEY

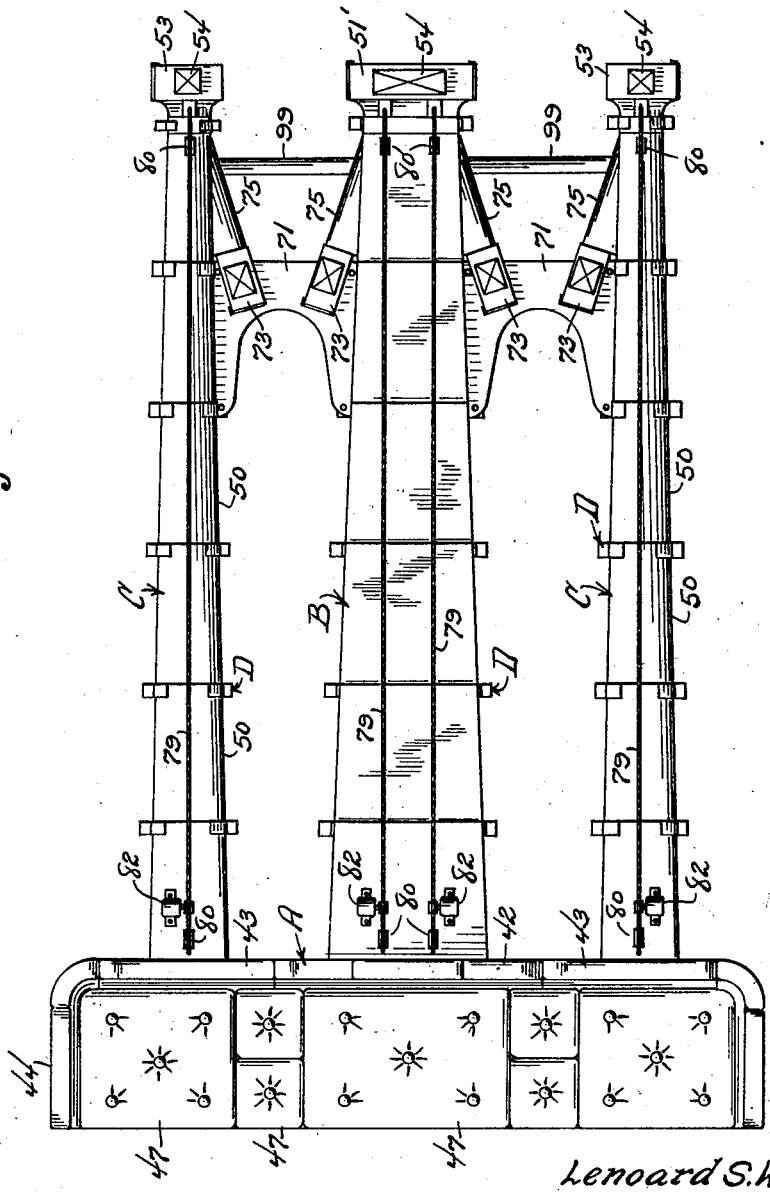

Jan. 12, 1932.  L. S. WALLACE  1,841,262
SHOOTING SALON
Filed Aug. 14, 1930  7 Sheets-Sheet 3
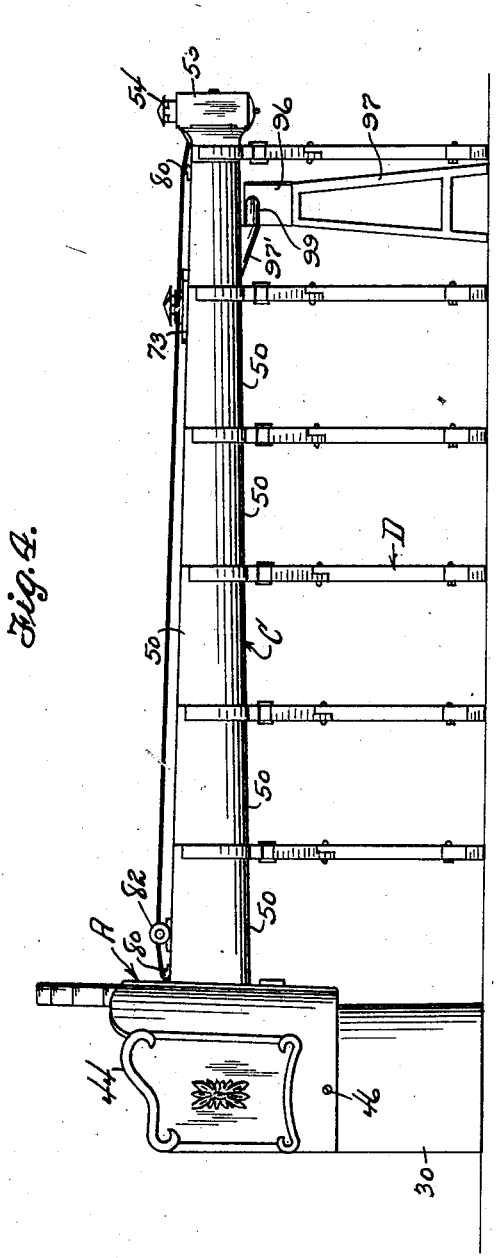
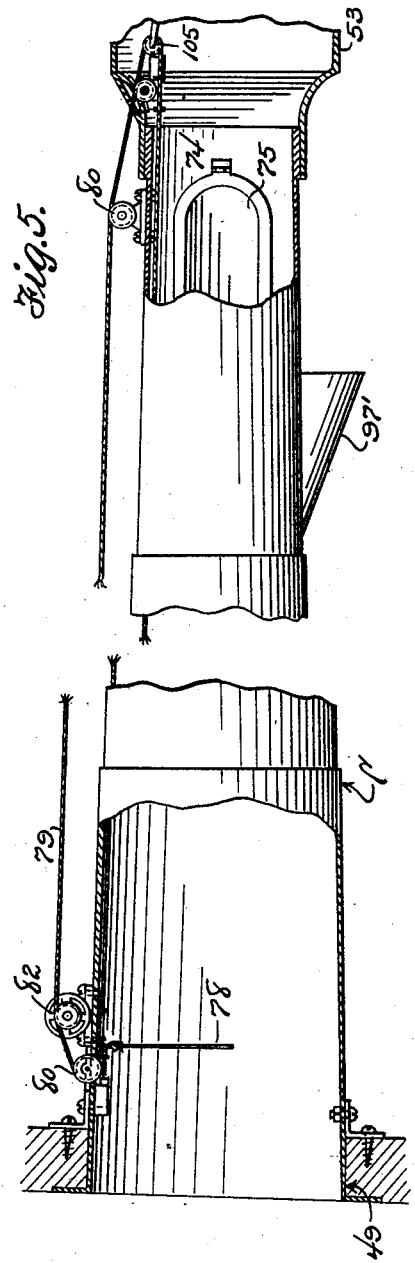
Lenoard S. Wallace
INVENTOR
BY Victor J. Evans
ATTORNEY

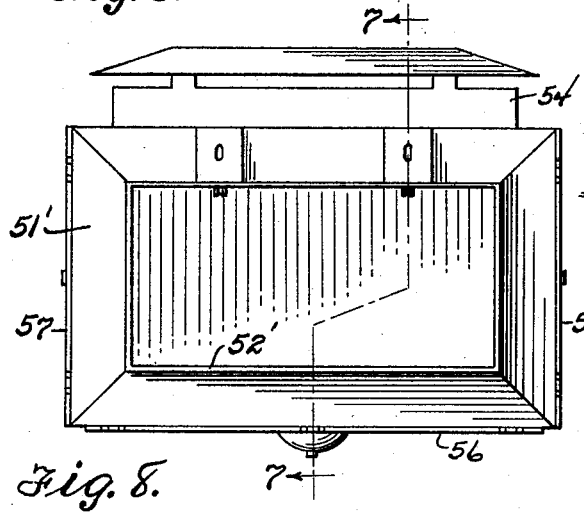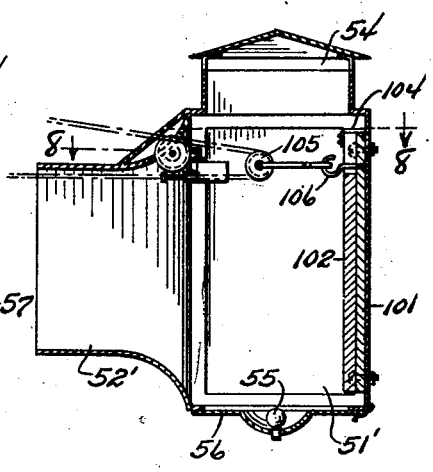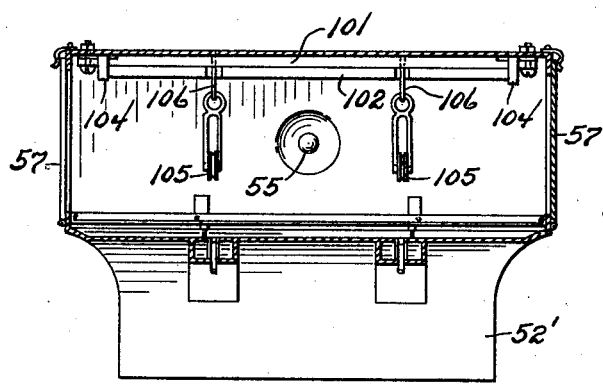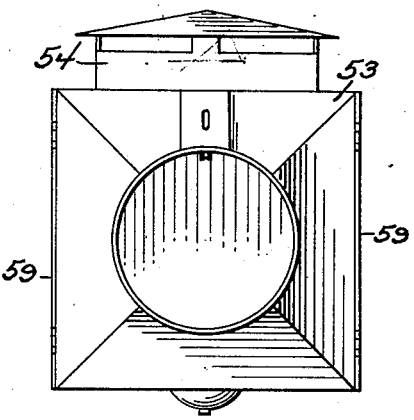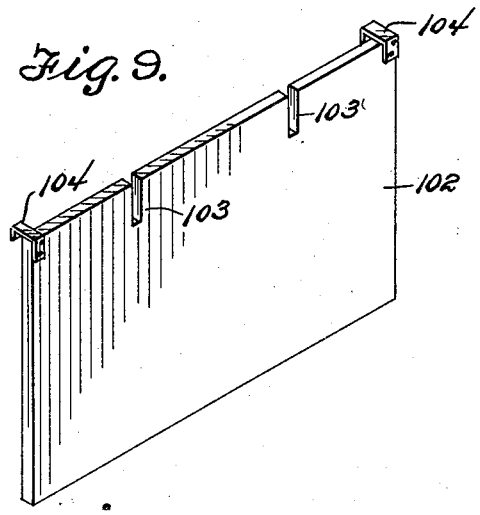

Jan. 12, 1932.  L. S. WALLACE  1,841,262
SHOOTING SALON
Filed Aug. 14, 1930   7 Sheets-Sheet 5
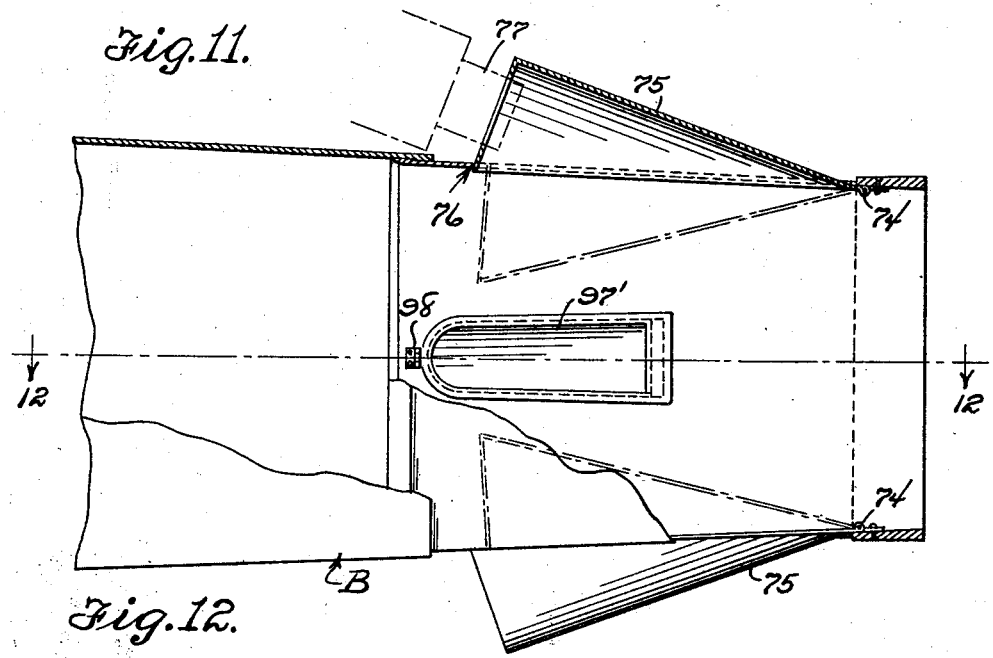
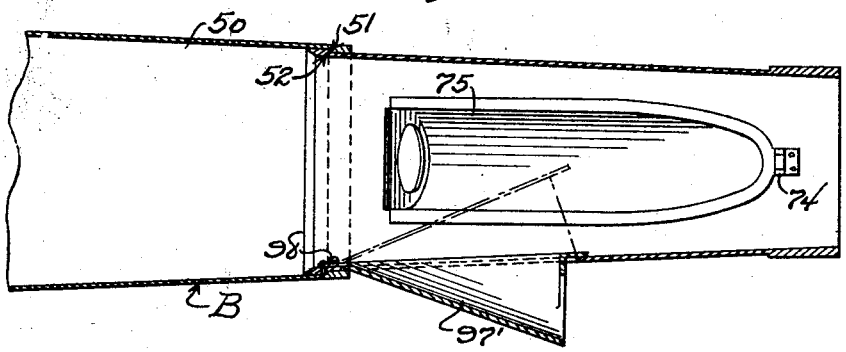
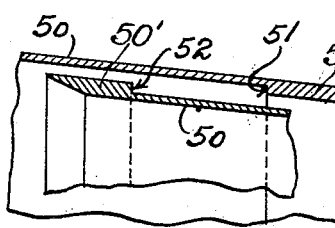
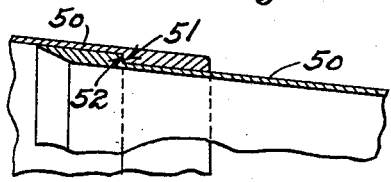
Lenoard S. Wallace
INVENTOR
BY Victor J. Evans
ATTORNEY Jan. 12, 1932.                L. S. WALLACE                1,841,262
                              SHOOTING SALON
                          Filed Aug. 14, 1930            7 Sheets-Sheet 6

Lenoard S. Wallace
INVENTOR
BY Victor J. Evans
ATTORNEY

Jan. 12, 1932.  L. S. WALLACE  1,841,262
SHOOTING SALON
Filed Aug. 14, 1930   7 Sheets-Sheet 7
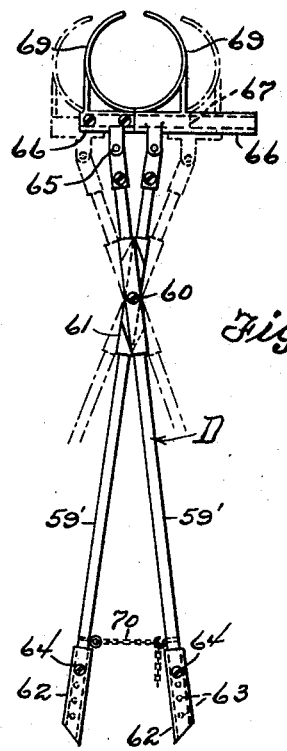
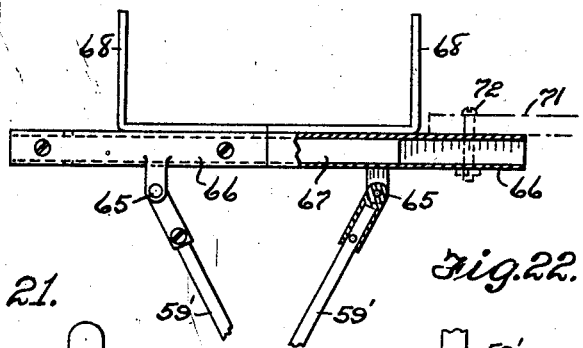
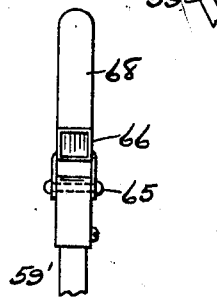
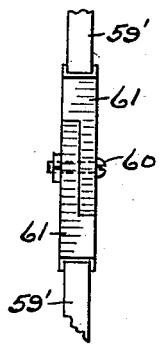
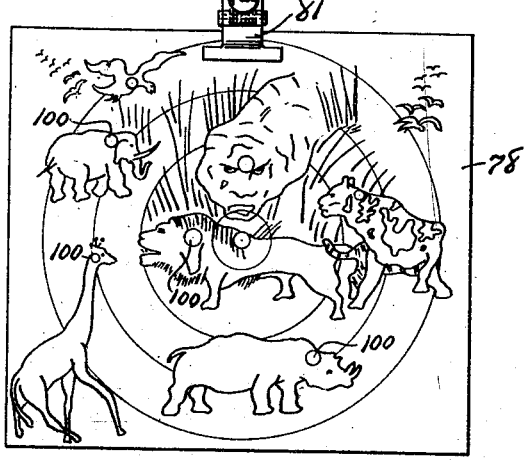
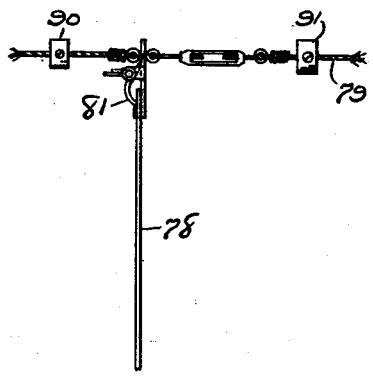
Lenoard S. Wallace
INVENTOR
BY Victor J. Evans
ATTORNEY Patented Jan. 12, 1932

1,841,262

UNITED STATES PATENT OFFICE

LENOARD S. WALLACE, OF NEW YORK, N. Y.

SHOOTING SALON

Application filed August 14, 1930. Serial No. 475,257.

This invention relates to amusement devices and has for an object the provision of a shooting salon especially adapted for parks, fairs and other public places of amusement.

Another object of the invention is the provision of a shooting salon, wherein the patron may shoot at a target or panel upon which is projected moving pictures of animals, fowls, birds, etc., represented in their native habitat, so as to provide a novel form of amusement which will also prove instructive.

Another object of the invention is the provision of a novel form of target for displaying the pictures, which target has thereon the representation of birds, animals, etc., which are invisible from a distance, with means upon the target also invisible from a distance to indicate vulnerable spots upon the animals, etc., so that a patron shooting at the pictures projected upon the target may strike a vunerable spot as above mentioned.

Another object of the invention is the provision of a light excluding conduit for housing the target, so that the pictures may be displayed both day and night, means being provided for moving the target from one to the other end of the conduit to determine the result of a shot.

Another object of the invention is the provision of a portable shooting salon which is of sectional construction and which includes a cabinet adapted to serve as a counter or rest for the patron when shooting, and to provide compartments for storing the remaining sections of the device when in knock down condition.

Another object of the invention is the provision of a shooting salon which, among its many other advantageous features, is simple in construction, may be readily set up for use, and will provide a pleasing and attractive appearance, as well as afford entertainment and instruction.

With the above and other objects in view, the invention further includes the following novel features and details of construction, to be hereinafter more fully described, illustrated in the accompanying drawings and pointed out in the appended claims.

In the drawings:—

Figure 3 is a top plan view.

Figure 4 is a side view.

Figure 5 is an enlarged fragmentary view partly in section showing one of the conduits, the target and the means for mounting the latter.

Figure 6 is an elevation of the detachable target house.

Figure 7 is a section on the line 7—7 of Figure 6.

Figure 8 is a section on the line 8—8 of Figure 7.

Figure 9 is a detail perspective view of one of the silence panels.

Figure 10 is an elevation of another form of target house.

Figure 11 is a fragmentary view partly in horizontal section showing the target end of the center conduit.

Figure 12 is a section on the line 12—12 of Figure 11.

Figure 13 is an enlarged fragmentary sectional view illustrating the adjacent ends of the telescopic conduit sections, the ends being separated.

Figure 14 is a similar view illustrating the ends of the conduit sections in contact.

Figure 19 is an elevation of one of the conduit supports.

Figure 20 is an enlarged fragmentary view partly in section showing the upper end of one of the supports for the central conduit.

Figure 21 is an inner edge view of one of the clamping members of the support shown in Figure 20.

Figure 22 is a fragmentary edge view illustrating the pivotal connection between the legs of the supports.

Figure 26 is an elevation of one of the targets.

Figure 27 is an edge view of the same with a portion of the supporting cable.

Referring to the drawings in detail wherein like characters of reference denote corresponding parts, the reference character A indicates a cabinet from which extends a central conduit B and side conduits C, while the reference character D indicates the supports for these conduits.

Figure 1:
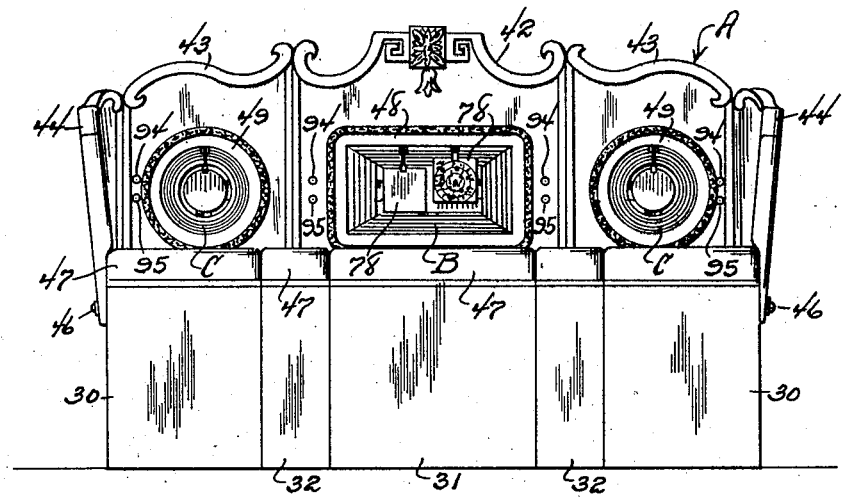
Figure 1 is a front elevation of the invention.

The cabinet A comprises a base which includes a pair of end sections 30, a central section 31, and sections 32 which are located between the sections 30 and 31.

These sections are provided with hinged tops 23 and their rear walls are provided with openings which are normally closed by doors 34. These doors and the tops 33 may be provided with suitable locks, whereby articles may be safely stored therein.

The adjacent side walls of the sections are provided with openings for the passage of bolts 35 and these bolts are provided with winged nuts 36 so that the sections may be readily assembled and disconnected.

The sections 30 are provided with vertical partitions 37 and horizontal partitions 38 for conveniently receiving and storing other parts of the device, so that the device may be compactly arranged for storage or shipment. The section 31 is likewise provided with vertical partitions 39 and horizontal partitions 40, while the sections 32 are provided with horizontal partitions 41, so that ample storage space for the remaining parts of the device, as well as for arms and ammunition, will be provided.

Figure 2:
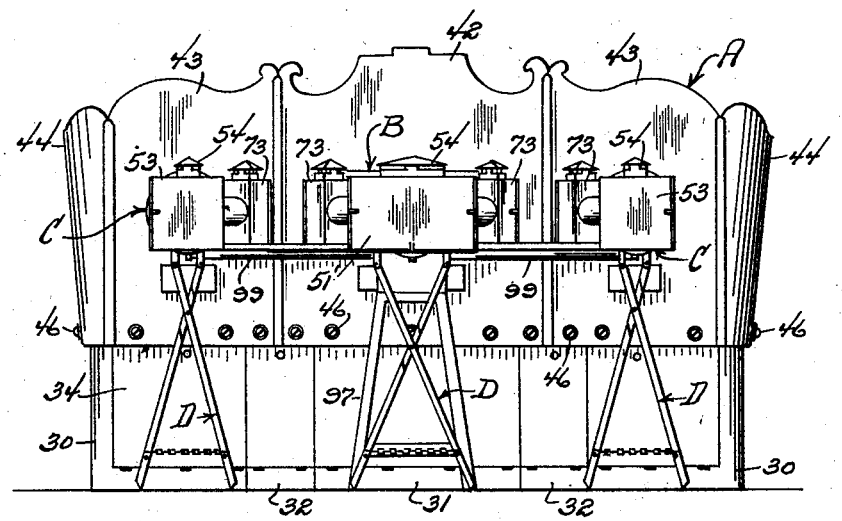
Figure 2 is a rear view.
Figure 15:
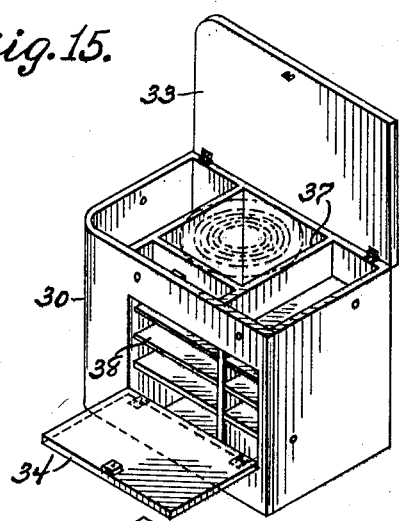
Figure 15 is a detail perspective view of one of the end sections of the cabinet.
Figure 16:
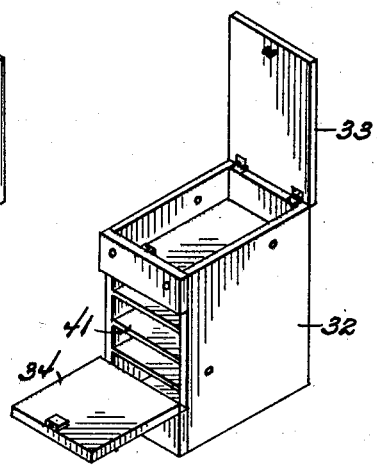
Figure 16 is a like view of one of the adjacent sections.
Figure 17:
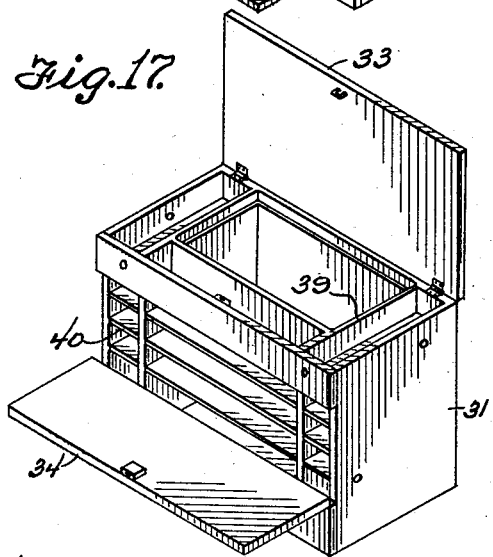
Figure 17 is a like view of the central section.
Figure 18:
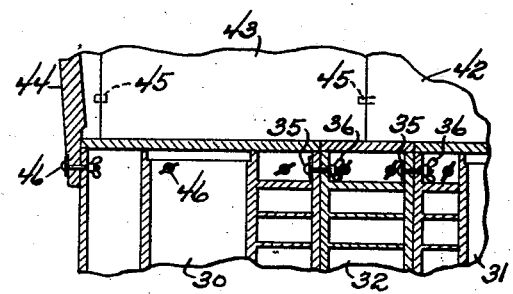
Figure 18 is a fragmentary vertical sectional view taken through one end of the cabinet.
Figure 23:
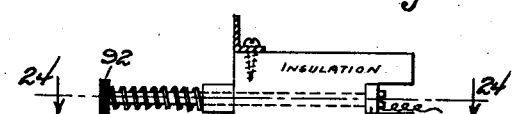
Figure 23 is a detail view of one of the automatic electric switches for the target.
Figure 25:
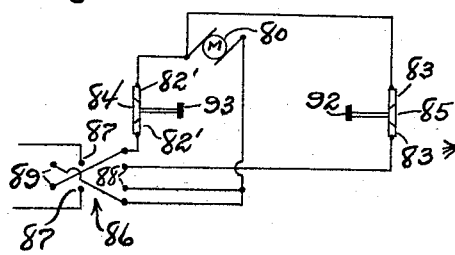
Figure 25 is a diagram of the wiring for controlling movement of the target.
Figure 24:
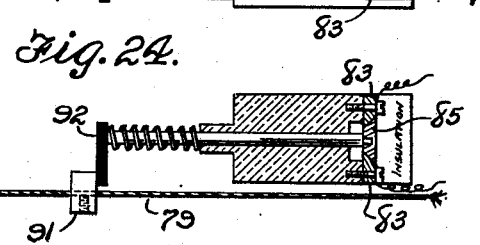
Figure 24 is a section on the line 24—24 of Figure 23.

Removably secured to the base is a central panel 42, upon the opposite sides is a panel 43, while end panels 44 rise from the base and are connected with the panels 43. The adjacent edges of the panels are connected by dowels 45 while bolts 46 serve to secure the panels to the base, as clearly shown in Figure 2 of the drawings. By reference to Figure 2 it will be seen that the doors 34 open at the rear of the cabinet so that when it is desired to obtain access to the compartments of the cabinet it will not be necessary to disturb the patrons.

The base has mounted thereon sectional cushions 47. These cushions provide rests for the arms of the patrons and in addition, serve as an attractive finish for the top of the cabinet base.

The panels 42 and 43 are provided with openings 48 and 49 respectively and the conduit B extends from the opening 48, while the conduit C extends from the opening 49.

These conduits are formed of separate sections, the conduit B being of rectangular cross sectional shape, while the conduits C are circular in cross section. The conduits are otherwise of like construction, so that it is believed a detailed description of one conduit will suffice.

The conduit C is formed of a number of longitudinally tapered, telescopically arranged sections 50. One end of each of these sections is provided upon its inside with an annular shoulder 51, while the other end is provided with an annular shoulder 52, the shoulders 51 and 52 of adjacent sections being adapted to engage when the conduit is extended so as to limit relative outward movement of the sections and prevent their separation. However, the sections may be readily moved inward so as to collapse the conduit. The outer end of the conduit B carries a removable target house 51' and this house is provided with a neck 52' which telescopes within the outer end of the outermost section 50. The target house may thus be removably attached to the end of the conduit. The shoulders 51 and 52 are formed around the edges of relatively thick portions 50' at the ends of the sections so that these portions also act to reinforce the walls of the conduits and increase their rigidity.

Likewise the outer ends of the conduits C are provided with a removable target house 53 and these houses 51' and 53 are provided with ventilating openings 54 in their top to permit of the escape of noxious fumes and gases. The target houses are provided with electric bulbs 55 which may receive current from any suitable source and may be controlled by individual switches, so as to serve as trouble lights in the event of any trouble within the target houses or the adjacent ends of the conduits. The target house 51' is provided with a hinged bottom 56 and with hinged sides 57, while the target house 53 is provided with hinged seats 59 so that ready access may be had to the interior of these houses. The conduits are supported by removable supports D. These supports comprise legs which are pivotally connected as shown at 60. The legs may be made of wood or other suitable material and may be reinforced at their points of pivotal connection by metallic reinforcing sleeves 61. The lower ends of the legs are provided with sleeves 62 which are adapted to engage the surface of the ground, and are further provided with spaced openings 63 for the reception of bolts 64 which pass through the sleeves 62 so that the lengths of the legs 59 may be adjusted to overcome inequalities of the surface upon which they rest.

The upper ends of the legs have pivotally secured thereto as shown at 65, sleeves 66, and extending from one of these sleeves is a finger 67 which is adapted to be removably received in the other sleeve. Rising from the sleeves 66 are clamping members 68 and 69. The clamping members 68 are of angular shape and are adapted to receive the rectangular central conduit B, while the clamping members 69 are substantially semi-circular so as to receive the conduits C. As the conduits B and C taper throughout their lengths, the clamping members 68 and 69 may be adjusted in accordance with their position or point of engagement with the conduits. Chains 70 at the lower ends of the legs 59 serve to prevent relative outward movement of the legs and to hold the members 68 and 69 in clamping engagement with the conduits.

In order to connect conduits B and C so as to stabilize the same, the invention provides platforms 71. These platforms are bolted or otherwise secured to the supports as shown at 72 in Figure 20 of the drawings. In addition these platforms serve to support moving picture projecting machines 73, which are adapted to project pictures of wild animals, birds, fowls, etc., into the target house. In order that light may be excluded from the conduits so as to permit of the use of the invention by daylight as well as night, the conduits have pivotally connected thereto as shown at 74, a hood 75. These sleeves operate within openings 76 provided in the conduits and their free ends are adapted to receive the lens 77 of the projecting machines 74. The central conduit B is preferably provided with a hood 75 upon each side for the accommodation of a pair of picture projecting machines, while the conduits C preferably have a single hood and a single machine.

The invention further provides a target for each conduit. These targets each comprise a panel 78 which is adapted to be positioned within one of the target houses and to be moved longitudinally of the conduit. For this purpose, each conduit is provided with a cable 79 which is movable over and around guide pulleys 80, two cables and two targets being provided for the conduit B. The targets are attached to the cables by means of spring clips 21 so that they may be readily removed and new targets substituted, while an electric motor 82 provides means for operating the cable so as to move the target from one to the other end of the conduit. The purpose of this is to position the targets within the target houses and when desired, to move these targets longitudinally of the conduits to the cabinet end thereof for purposes of inspection. This movement of the targets is accomplished through the operation of the motor 80 which is in electrical connection with a pair of contacts 82 at the cabinet end of the conduit and with a pair of contacts 83 at the remote end. The contacts 82 are adapted to be bridged by a spring influenced switch 84, while the contacts 83 are adapted to be bridged by a spring influenced switch 85. A reversing switch 86 is connected with the motor 80 and includes spaced contacts 87 and spaced contacts 88, and in addition, spaced contacts 89. The cable 79 carries spaced contacts 90 and 91 which are arranged upon opposite sides of the target panel 78. Assuming that the target panel is within the target house, the stop 91 will be engaged with an insulated arm 92 of the switch 85 and will hold this switch spaced from the contacts 83 so that current cannot flow through these contacts to the motor 80. The switch 81 however will bridge the contacts 82, so that by operating the switch 86 to bring the contacts 89 into engagement with the contacts 87, current will flow from a suitable source through the contacts 87 and 89, the contacts 82 and 84, the motor 80 and back through the switch contacts 89 and 87. The motor will thus be operated in a direction to cause the target to travel to the forward or cabinet end of the conduit. When the stop 90 engages the insulated arm 93 of the contact 84, this contact will be operated to break the circuit just described through the motor and as the arm 92 of the contact 85 has been released, the contact 85 will bridge the contacts 83. Thus, when the switch 86 is operated to bring the contacts 89 into engagement with the contacts 88, current will flow through one of the contacts 88 to the contacts 83 and 85, the motor 80, the other contact 88 and the contact 89 so as to complete a circuit through the motor and move the target in a reverse direction. The target will continue this movement until the cable carried stop engages the insulated arm to open the circuit. The switch 96 includes a pair of buttons 94 and 95, one of which is operated to move the target in one direction and the other to move the target in an opposite direction.

The reference character 96 indicates a cabinet which is mounted upon a suitable support 97 which is adapted to contain a sound reproducing machine, such as a phonograph. This cabinet is in communication with the conduit B through a hood 97' which is similar to the hoods 75 and like these hoods is pivotally mounted as shown at 98. This hood 97' provides means whereby music or other sounds from the cabinet 96 may enter the conduit B and at the same time exclude light. The sound reproducing machine may function to supply suitable music to add to the attractiveness of the invention, or it may be used to provide sounds such as are made by animals, birds, etc. to add to the realistic effect of the pictures upon the target. Pipes or conduits 99 extend from the cabinet 96 and communicate with the conduits C so that a single sound reproducing machine will suffice for all of the conduits.

The target panels 78 are of novel construction and as shown in Figure 26 these panels have depicted thereon the representation of wild animals, birds, fowls, etc. in their native habitat. The representation however is of such a character that the animals, etc. will be invisible when the target is in the target box, so that the only thing to be seen upon the target will be the pictures projected thereon from the moving picture machines. In addition, the animals, birds, etc. have circles 100 marked thereon which represent vulnerable spots, so that when a marksman strikes one of these spots he is supposed to have killed the animal. However, these spots are also invisible from a distance, so that the only mark the marksman shoots at will be the picture projected upon the panel by the moving picture machine. If he strikes one of the vulnerable spots 100 the result of the shot may be determined by bringing the target to the cabinet end of the conduit, as previously explained. Regular patrons quickly become acquainted with the position of these spots, as well as the positions of the animals upon the panels, so that by practice they will be able to strike a spot and make a "kill."

It will be apparent from the foregoing description and accompanying drawings that the invention provides an exceedingly attractive device which will not only afford amusement and a test of skill, but will also prove instructive in that it will show the animals, birds, etc. in their native surroundings. In addition, the device is so constructed that it may be readily disassembled and packed within the compartments of the cabinet sections for transportation or storage, and thus particularly adapts it for use at fairs, parks and other public places of amusement.

The rear wall of the target house of each conduit is provided with a metallic backing plate 101 which is positioned at the rear of the target when the latter is in the target house so that a bullet penetrating the target will strike this backing plate. In order to overcome the objectionable noise when the bullet strikes the plate, the latter is provided with a silence panel 102. This panel may be made of wood or any other suitable material and is of such thickness that the bullet, after passing through the target, will strike the panel 102 and will therefore not strike the backing plate with sufficient force to make objectionable noise. The plate 101 however serves to insure against the bullet passing through the rear wall of the target house.

The silence panel is provided with spaced slots 103 for the accommodation of the cables of the targets, and with hooks 104 which engage over the upper edges of the plates 101. These silence panels are thus readily removable and may be replaced when desired.

The cables 79 extend into the target houses and engage rollers 105 which are removably engaged with hooks 106.

While the invention as described preferably utilizes the still picture side of the target panels for displaying the moving pictures, obviously, the still pictures may be placed upon a celluloid or other transparent panel and the moving pictures displayed upon the side of this panel opposite the still pictures.

It is preferred however to make the target panels of cardboard and suitably place the still pictures thereon, with the tone of the pictures sufficiently close to the tone of the background as to render said pictures invisible from a distance.

The invention is susceptible of various changes in its form, proportions and minor details of construction and the right is herein reserved to make such changes as properly fall within the scope of the appended claims.

Having described the invention what is claimed is:—

1. In a shooting salon, a conduit open at one end, a target panel adapted to be disposed at the other end of the conduit, means to project moving pictures into said conduit upon the panel, and means upon the panel invisible from the open end of the conduit to determine the result of a shot.

2. In a shooting salon, a conduit open at one end, a target panel adapted to be disposed at the other end of the conduit, means to project moving pictures into said conduit upon the panel, means upon the panel invisible from the open end of the conduit to determine the result of a shot, and means to move the target longitudinally of the conduit.

3. In a shooting salon, a conduit open at one end, a target panel adapted to be disposed at the other end of the conduit, means to project moving pictures into said conduit upon the panel, means upon the panel invisible from the open end of the conduit to determine the result of a shot, and electrically operated means to move the target longitudinally of the conduit.

4. In a shooting salon, a conduit open at one end, a target panel adapted to be disposed at the other end of the conduit, means to project moving pictures into said conduit upon the panel, means upon the panel invisible from the open end of the conduit to determine the result of a shot, and a silence backing for the target.

5. In a shooting salon, a conduit open at one end, a target panel adapted to be disposed at the other end of the conduit, means to project moving pictures into said conduit upon the panel, means upon the panel invisible from the open end of the conduit to determine the result of a shot, a backing for the target, and a removable silencing panel for said backing.

6. In a shooting salon, a conduit open at one end, a target panel adapted to be disposed at the other end of the conduit, an open ended hood extending from and in communication with the conduit, a moving picture projecting machine fitting into the open end of the hood to project pictures into said conduit onto the panel, and means upon the panel to determine the result of a shot.

7. In a shooting salon, a conduit open at one end, a target panel adapted to be disposed at the other end of the conduit, means to project moving pictures into said conduit upon the panel, means upon the panel invisible from the open end of the conduit to determine the result of a shot, a sound reproducing machine, and means to convey the sound from said machine into the conduit.

8. In a portable shooting salon, a cabinet comprising a base, panels rising from the base and having openings therein, sectional conduits extending from said openings, means to support the conduits, targets adapted to be positioned within the conduits remote from the openings, and compartments arranged within the base of the cabinet to removably receive the conduits, their supports and targets.

9. In a portable shooting salon, a cabinet comprising a base, panels rising from the base and having openings therein, sectional telescopic conduits extending from said openings, means to support the conduits, targets adapted to be positioned within the conduits remote from the openings, and compartments arranged within the base of the cabinet to removably receive the conduits, their supports and targets.

10. In a portable shooting salon, a cabinet comprising a base, panels rising from the base and having openings therein, sectional conduits extending from said openings, means to support the conduits, targets adapted to be positioned within the conduits remote from the openings, sectional cushions arranged upon the top of the cabinet in front of the openings, and compartments arranged within the base of the cabinet to receive the conduits, their supports, the cushions and targets.

11. In a portable shooting salon, a cabinet comprising a base, detachable panels rising from the base, at least one of said panels having an opening therein, a sectional conduit extending from said opening, removable means to support said conduit, a removable target house in communication with the other end of the conduit, and compartments within the base to removably receive the panels, conduit, supports, target house and target.

12. In a shooting salon, a cabinet compris-
ing a base, a panel rising from the base and having an opening therein, a conduit extending from said panel, a target house at the remote end of the conduit, a target adapted to be disposed within said house, means to mount the target for movement longitudinally of the conduit, and means to move the target.

13. In a shooting salon, a cabinet comprising a base, a panel rising from the base and having an opening therein, a conduit extending from said panel, a target house at the remote end of the conduit, a target adapted to be disposed within said house, means to mount the target for movement longitudinally of the conduit, electrically operated means to move the target, and means to automatically stop movement of the target at each end of the cabinet.

14. In a portable shooting salon, a cabinet comprising a base, panels rising from the base and having openings therein, conduits extending from said openings, a target adapted to be located in the remote end of each conduit, means to project moving pictures upon said targets, a sound reproducing machine, and means to convey the sound from said machine into each of the conduits.

15. In a portable shooting salon, a cabinet comprising a base, panels rising from the base and having openings therein, conduits extending from said openings, a target adapted to be located in the remote end of each conduit, means to support the conduits, platforms connecting the conduit supporting means to stabilize and hold the conduits in position, picture projecting machines mounted upon the platforms, and housings communicating with the conduits and receiving the lenses of the projecting machines to project pictures upon the targets.

16. In a shooting salon, a cabinet having an opening therein, a conduit extending from the opening, a target adapted to be positioned in the end of the conduit remote from the opening, and adjustable supports for said conduit, said supports each including a pair of pivotally connected legs, a clamping member pivotally secured to the upper end of each leg, and means rigid with the clamping members to adjust said members relatively to grip the conduit.

In testimony whereof I affix my signature.

LENOARD S. WALLACE.